United States Patent [19]
Luechinger et al.

[11] Patent Number: 5,345,043
[45] Date of Patent: Sep. 6, 1994

[54] WEIGHING SCALE HAVING A REMOVABLE TOP WALL

[75] Inventors: Paul Luechinger, Uster; Eduard Fringeli, Bubikon, both of Switzerland

[73] Assignee: Mettler-Toledo AG, Greifensee, Switzerland

[21] Appl. No.: 22,158

[22] Filed: Feb. 23, 1993

[30] Foreign Application Priority Data

May 19, 1992 [CH] Switzerland ............... 1595/92-6

[51] Int. Cl.⁵ ............... G01G 21/28; E05C 1/00; A47F 3/00; A47B 47/00
[52] U.S. Cl. ............... 177/180; 177/181; 292/156; 292/32; 312/114; 312/263
[58] Field of Search ............... 177/238, 180, 181; 292/156, 162, 194, 202, 32; 312/114, 263, 285, 287, 289

[56] References Cited

U.S. PATENT DOCUMENTS

| | | | |
|---|---|---|---|
| 493,096 | 3/1893 | Kregel | 292/202 |
| 889,484 | 6/1908 | Parker | 292/149 |
| 1,151,781 | 8/1915 | Goddard et al. | 292/DIG. 48 |
| 1,189,417 | 7/1916 | Zimmerman | 177/238 |
| 2,268,074 | 5/1981 | Alexander | 292/149 |
| 3,944,266 | 3/1976 | Weaver | 292/149 |
| 4,664,207 | 5/1987 | Knothe et al. | 177/181 |
| 4,700,793 | 10/1987 | Luechinger | 177/181 |
| 4,798,250 | 1/1989 | Knothe et al. | 177/181 |
| 4,821,821 | 4/1989 | Kelley | 177/181 |
| 4,862,978 | 9/1989 | Borchard | 177/180 |
| 4,921,058 | 5/1990 | Pally et al. | 177/181 |

FOREIGN PATENT DOCUMENTS 7736324 3/1978 Fed. Rep. of Germany.
461121 10/1968 Switzerland.

Primary Examiner—Benjamin R. Fuller
Assistant Examiner—Randy W. Gibson
Attorney, Agent, or Firm—Laubscher & Laubscher

[57] ABSTRACT

A weighing scale housing has a top cover wall removably fastened to the housing rear wall, whereby after the top wall has been unfastened and removed from the rear wall, the transparent side and front walls of the housing may be removed from the housing base for cleaning.

10 Claims, 4 Drawing Sheets

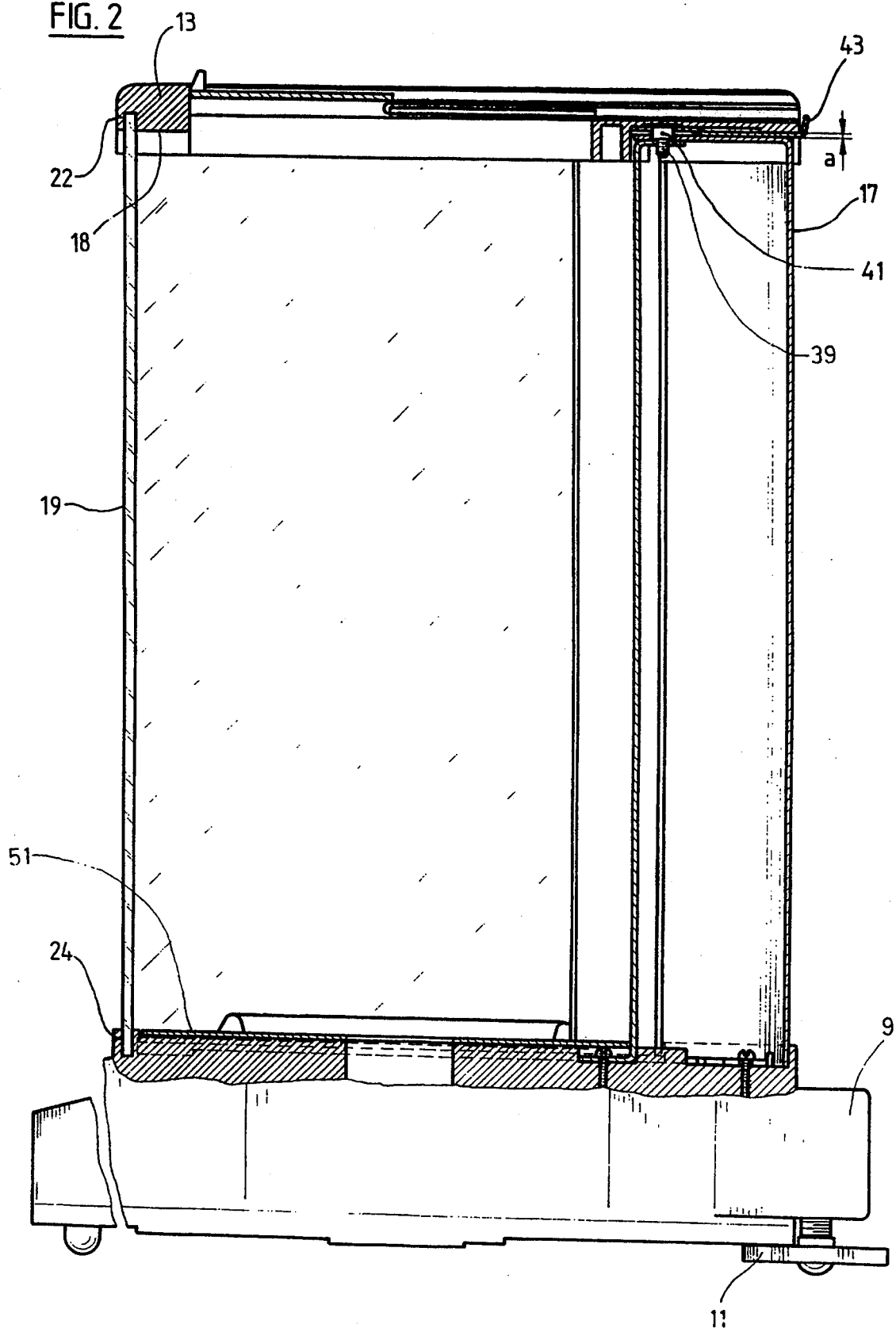

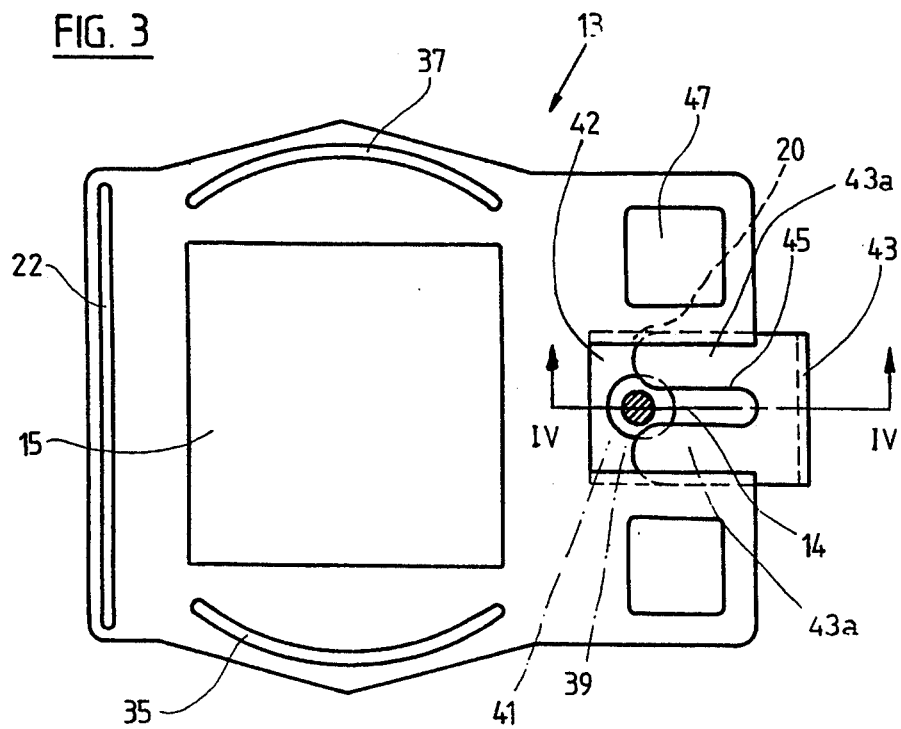
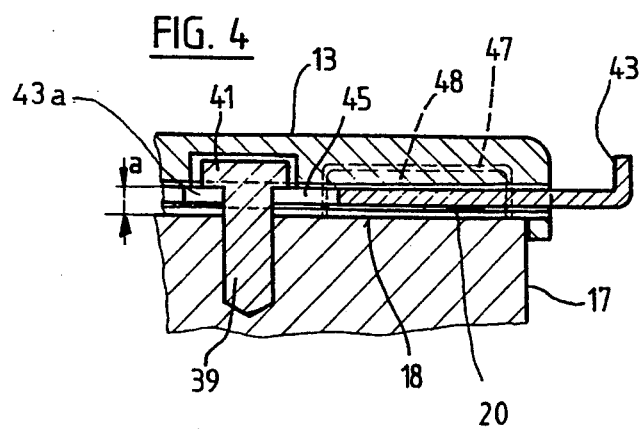
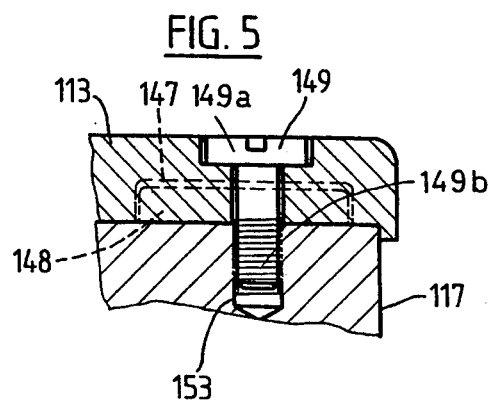

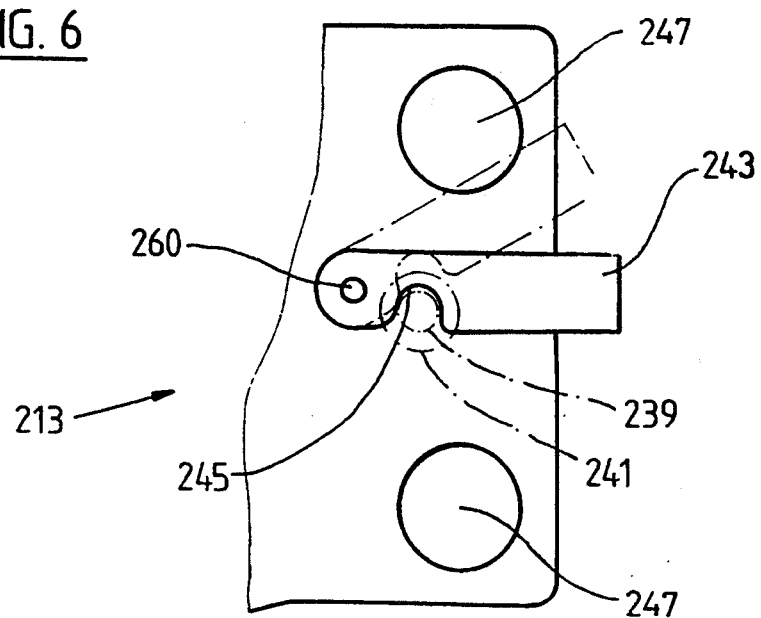

WEIGHING SCALE HAVING A REMOVABLE TOP WALL

SPECIFICATION

REFERENCE TO RELATED APPLICATIONS

This application is related to the companion applications in the names of Luechinger et al Ser. No. 07/964,017 filed Oct. 21, 1992, (now U.S. Pat. No. 5,264,667 issued Nov. 23, 1993), Luechinger et al Ser. No. 08/002,753, filed Jan. 13, 1993, and Luechinger Ser. No. 07/978,387 filed Nov. 18, 1992, each assigned to the same assignee as the instant invention.

STATEMENT OF THE INVENTION

A weighing scale housing includes a horizontal top wall that is removably connected by releasable fastening means with the housing rear wall, thereby to permit removal of the top wall and the transparent front and-/or side walls of the housing for cleaning.

BRIEF DESCRIPTION OF THE PRIOR ART

It is known in the prior art to provide housings for weighing scales that include enclosed or partially enclosed weighing chambers, thereby to protect the movable weighing pan within the chamber from the deleterious effects of drafts and air currents. Examples of such weighing scale housings are shown in the prior patents to Knothe et al U.S. Pat. Nos. 4,664,207 and 4,798,250. Often the vertical side walls of the housing are connected with the base for movement between closed and open positions, thereby to permit lateral access to the weighing chamber. In many cases, it is also possible to obtain access to the weighing chamber through the cover of the housing, for example, via an access opening that is normally closed by a sliding window. The sliding windows, which generally are formed of a transparent material such as glass, are subject to contamination by the vapors in the room or by the materials being weighed on the weighing pan in the weighing chamber. In such conventional scales, cleaning of the walls of the weighing chamber is quite labor consuming, and the sliding windows can be completely cleaned only in the rarest of cases. Thus, the undesired residue build up over the passage of time, particularly in the areas that overlap the scale housing, as well as along the upper and lower guide tracks, thereby adversely influencing the operability of the sliding windows.

The present invention was developed in order to provide an improved precision weighing apparatus in which the top wall and the transparent windows and walls that form the weighing chamber may be removed for cleaning in a simple economic manner.

SUMMARY OF THE INVENTION

Accordingly, it is a primary object of the present invention to provide a weighing apparatus housing having a horizontal top cover wall that is removably fastened to the vertical rear wall of the housing, thereby to permit removal of the top cover wall for cleaning. Furthermore, following removal of the top cover wall, the sidewalls of the housing may be similarly removed from the housing base for cleaning, together with the transparent front wall of the housing. The bottom wall of the weighing chamber may include a removable layer that is seated on the base and which is removable from the housing for cleaning as a unit.

In accordance with a further object of the invention, the fastening means for connecting the top cover member with the vertical rear wall of the housing may include a simple manually-operable latch plate, a manually-operable fastener bolt, or the like, thereby facilitating not only a simple cleaning operation, but also reducing the manufacturing cost of the housing.

BRIEF DESCRIPTION OF THE DRAWINGS

Other objects and advantages of the invention will become apparent from a study of the following specification when viewed in the light of the accompanying drawings, in which:

FIG. 2 is a sectional view taken along line II—II in FIG. 1.

FIG. 3 is a bottom view of the top cover member of FIG. 1;

FIG. 4 is a detailed sectional view taken along line IV-IV of FIG. 3;

FIG. 5 is a detailed sectional view of a second embodiment of the fastening means for fastening the cover member to the housing rear wall; and FIG. 6 is a third embodiment of the fastening means for removably connecting the top cover member to the rear wall of the housing.

DETAILED DESCRIPTION

Figure 1:
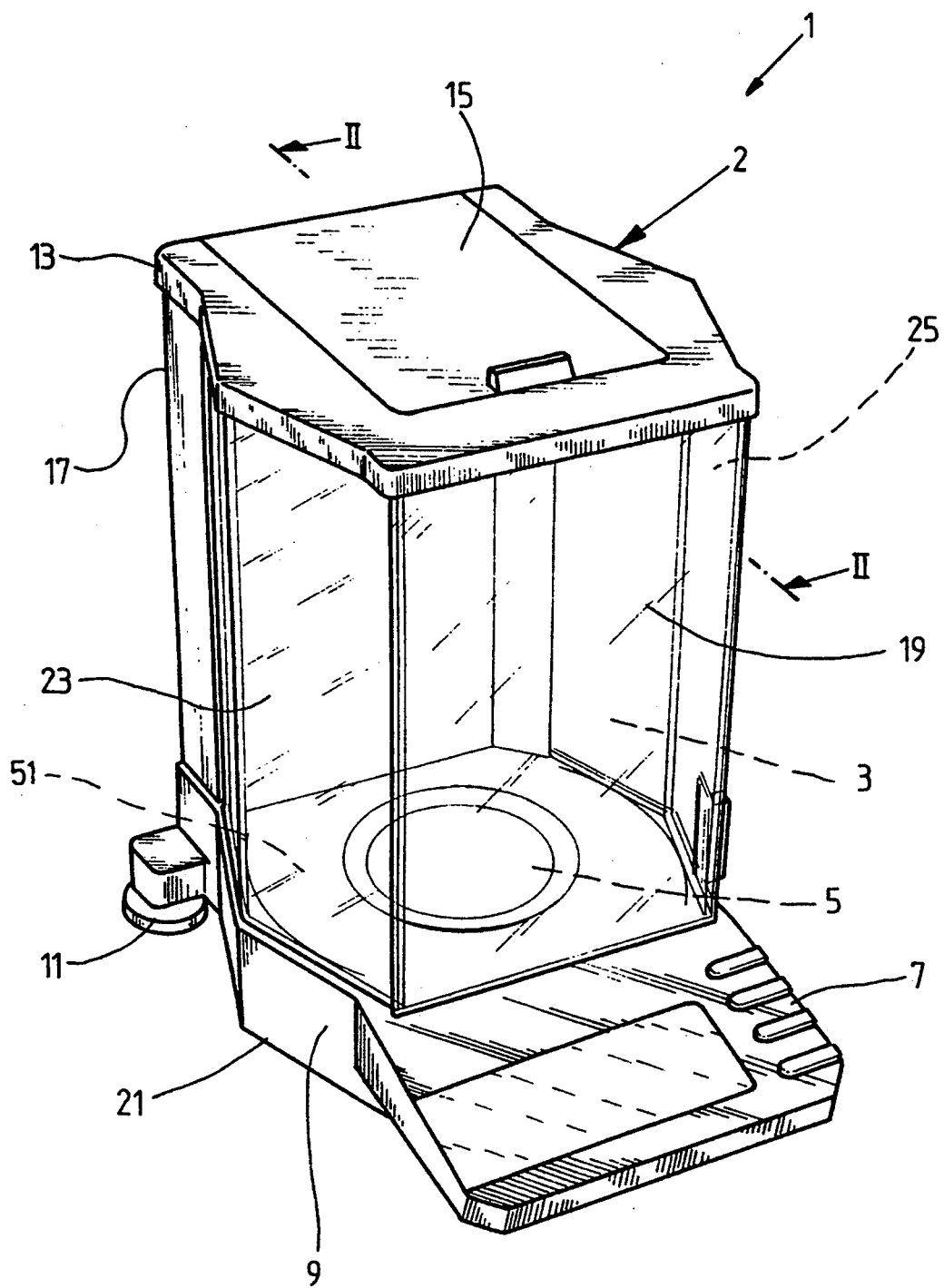
FIG. 1 is a front perspective view of a first embodiment of the improved weighing apparatus housing of the present invention.

Referring first more particularly to FIGS. 1 and 2, the weighing apparatus 1 is of the windscreen type including a housing 2 containing a weighing chamber 3 in which is movably mounted a weighing pan 5 for receiving the material to be weighed. The housing includes a base 9 provided with a conventional keyboard and display arrangement 7. The conventional mechanical and electronic apparatus for measuring the mass of the object to be weighed are contained within the base 9, as is known in the art. The housing 2 includes a transparent front wall 19, a pair of transparent slidably movable sidewalls 23 and 25, and a vertical rear wall 17 that is secured at its lower end to the base 9. The top of the weighing chamber 5 is closed by a horizontal top cover wall 13 that contains an access opening which is normally closed by a pivotably or slidably movable window 15, whereby access to the weighing chamber is afforded either via the movable sidewalls 23 and 25, or through the access opening covered by movable window 15.

As disclosed in the prior Luechinger et al application No. 07/964,017 filed Oct. 21, 1992, (now U.S. Pat. No. 5,264,667 issued Nov. 23, 1993, the sidewalls 23 and 25 are guided for sliding movement along arcuate paths toward and away from the rear wall 17. Referring to FIG. 3, it will be seen that the bottom of the cover member 13 contains arcuate guide tracks 35 and 37 that receive guide pins (not shown) for positioning and guiding the upper ends of the sidewalls during their sliding movement between the closed and open positions. Similar guide grooves (not shown) are mounted in the base 9, and form no part of the present invention. Conventional levelling screws 11 are provided at the rear corners of the base in order to effect levelling of the weighing scale housing 2.

In accordance with a characterizing feature of the present invention, fastener means are provided for removably connecting the top cover member 13 with the upper end of the housing rear wall 17.

To this end, a vertical bolt 39 having an enlarged head portion 41 is threadably connected at its lower end in a corresponding tapped bore contained in the upper surface of the housing rear wall 17, the enlarged head portion being spaced a given distance—a—from the upper surface 18 of the rear wall 17. A bifurcated locking plate 43 is slidably mounted at each of its side edges in a slot 42 contained within the rear edge portion of the cover member 13, as shown in FIGS. 3 and 4. Thus, the slot 45 defined between the leg portions 43a of the bifurcated plate 43 is adapted to receive the threaded portion of bolt 39 when the locking plate is shifted to the left from its released position of FIG. 3 toward the locking position of FIG. 4, whereupon the portions 43a of the bifurcated locking plate extend beneath the enlarged head portion 41 of bolt 39, as shown in FIG. 4, thereby to prevent lifting of the top cover wall 13 from the bolt 39. Furthermore, in order to properly position the cover 13 on the upper end of the housing vertical walls, the rear wall 17 includes upwardly directed projections 48 that extend within corresponding recesses 47 contained in the bottom surface of the top cover member. As shown in FIGS. 2 and 3, the bottom surface of the cover member also contains a positioning slot 22 for receiving the upper edge of the transparent front wall 19, the bottom edge portion of the front wall extending within groove 24 contained in base 9, as shown in FIG. 2.

Thus, the bifurcated locking plate 43 is operable to fasten the horizontal top cover member 13 to, and to release the member from, the upper end of the housing rear wall 17. Of course, as an alternative, the bolt 39 could be provided on the bottom of the cover member 13, and the bifurcated locking plate 43 could be slidably mounted on the rear wall 17, if desired. When the bifurcated locking plate is displaced toward its unlocked position relative to the bolt 39, the top cover plate 13 may be lifted from the housing, whereupon the side and front walls could also be removed for cleaning. Furthermore, a removable bottom member 51 may be provided that is seated on the upper surface of the base 9, thereby to permit removal of the bottom member 51 for cleaning as well.

Referring to FIG. 5, as an alternative, top cover member 113 may be fastened to the housing rear wall 117 by a bolt 149 having an enlarged head portion 149a contained in a counter bore provided in the upper surface of the cover member 113. The bolt 149 includes a threaded portion 149b that extends downwardly into threaded engagement with a tapped bore 153 contained within the upper end of the rear wall 117. Locator projections 148 on the rear wall 117 extend upwardly within corresponding recesses 147 contained in the lower surface of the top cover wall 113.

Referring to the alternate embodiment of FIG. 6, a latch plate 243 containing a lateral slot 245 is pivotally connected at one end with the cover member 213 by pivot shaft 260, the latch plate being operable between the locking position relative to bolt 239 beneath enlarged head portion 241, and the released position shown in phantom. The cover member 213 is provided with locator recesses 247 for cooperation with corresponding upwardly extending projections on the housing rear wall (not shown).

While in accordance with the provisions of the Patent Statutes the preferred form and embodiments of the invention have been illustrated and described, it will become apparent to those skilled in the art that various changes and modifications may be made without deviating from the inventive concepts set forth above.

What is claimed is:

1. Weighing apparatus, comprising:
   (a) a horizontal base (9);
   (b) a plurality of generally rectangular vertical walls including a front wall (19), a rear wall (17), and a pair of side (23,25) walls cooperating with said base to define an open-topped weighing chamber (3) for receiving a movable weighing pan (5), said vertical walls each having an upper edge portion and a lower edge portion, the lower edge portion of said rear wall being rigidly secured to said base, and the lower edge portions of said front wall and said side walls being removably connected with said base;
   (c) means including a horizontal top wall (13) removably mounted on the upper edge portions of said front wall, said side walls, and said rear wall to close the top of said chamber; and
   (d) fastening means (43, 149, 243) for removably connecting said top wall with said rear wall and for simultaneously maintaining said top wall in engagement with said front wall and said side walls, and for maintaining said front wall and said side walls in engagement with said base;
   (e) at least one of said vertical side walls being connected with said base and with said top wall for horizontal movement between closed and open positions, respectively, relative to said rear wall and said front wall, thereby to afford lateral access to said chamber.

2. Apparatus as defined in claim 1, wherein said horizontal top wall has a bottom surface, and further including positioning means (22, 35, on said bottom surface of said top wall for positioning the upper edge portions of said front wall and at least one of said side walls relative to said top wall.

3. Apparatus as defined in claim 1, wherein said fastening means comprises a vertical first member (39, 239) having a first end portion connected with one of said rear and top walls, said first member having a second end portion with an enlarged head portion (41, 241), and a second member (43, 243) connected with the other of said rear and top walls for horizontal movement between locked and released positions relative to said enlarged head portion of said first member, respectively.

4. Apparatus as defined in claim 3, wherein said second member comprises a bifurcated latch plate (43) connected with said other wall for sliding movement toward and away from said first member, respectively, said latch plate containing a slot (45) for receiving said first end portion of said first member.

5. Apparatus as defined in claim 3, wherein said second member comprises a latch plate (243) connected with said top wall for pivotal movement about a vertical pivot axis, said latch plate containing a slot (245) for receiving said first portion of said first member when said latch plate is in the locked position beneath said enlarged head portion.

6. Apparatus as defined in claim 1, wherein said fastening means comprises a bolt (149) having an enlarged head portion (149a), and a threaded portion (149b) that extends downwardly through a bore contained in said top member and terminates in threaded engagement with a tapped bore (153) contained in the upper end of said rear wall.

7. Apparatus as defined in claim 1, and further including positioning means (47, 48) for positioning the upper edge portion of said rear wall relative to said top wall.

8. Apparatus as defined in claim 7, wherein said positioning means includes at least one projection (48) on one of said first and second members that projects within a corresponding recess (47) contained in the other of said first and second members.

9. Apparatus as defined in claim 1, wherein said top wall contains an access opening, and a lid member (15) connected with said top wall for movement between closed and open positions relative to said access opening.

10. Apparatus as defined in claim 1, wherein said front wall and at least one of said side walls are transparent and are removably mounted on said base for cleaning.

* * * * *